United States Patent

Tanaka

[15] 3,648,544
[45] Mar. 14, 1972

[54] TRANSMISSION

[72] Inventor: Seiji Tanaka, Aki-gun, Hiroshima-ken, Japan

[73] Assignee: Toyo Kogyo Co., Ltd., Hiroshima-ken, Japan

[22] Filed: Sept. 24, 1969

[21] Appl. No.: 860,522

[52] U.S. Cl. ................................................74/695, 74/730
[51] Int. Cl. ....................................F16h 47/08, F16h 57/00
[58] Field of Search ............................74/695, 694, 700, 701

[56] References Cited

UNITED STATES PATENTS

| | | | |
|---|---|---|---|
| 3,446,095 | 5/1969 | Bookout | 74/695 X |
| 2,287,279 | 6/1942 | Stumpf | 74/700 X |
| 2,757,557 | 8/1956 | Hoffman | 74/695 X |
| 2,884,813 | 5/1959 | Kelley | 74/754 |
| 3,043,163 | 7/1962 | Hobbs | 74/695 X |
| 3,292,454 | 12/1966 | Konrad et al. | 74/688 |
| 3,474,690 | 10/1969 | Lepelletier | 74/695 X |
| 3,482,469 | 12/1969 | Mori | 74/688 |
| 3,505,905 | 4/1970 | Lepelletier | 74/688 |

OTHER PUBLICATIONS 1,177,949, German printed application, Renault Sept. 10, 1964

*Primary Examiner*—Carlton R. Croyle
*Assistant Examiner*—Thomas C. Perry
*Attorney*—Stevens, Davis, Miller & Mosher

[57] ABSTRACT

An automotive transmission is disclosed having first, second and third serially connected housings enclosing an engine driven torque converter, a wheel driving differential gear unit, and a planetary gear set in the respective housings. Input and output shafts project from opposite ends of the planetary gear set with the former connected to the torque converter and the latter connected to a reversing gear set. A further shaft connects the differential gear unit with the reversing gear unit. The transmission thus formed is compact and may be used in either front engine-front drive or rear engine-rear drive vehicles.

3 Claims, 2 Drawing Figures

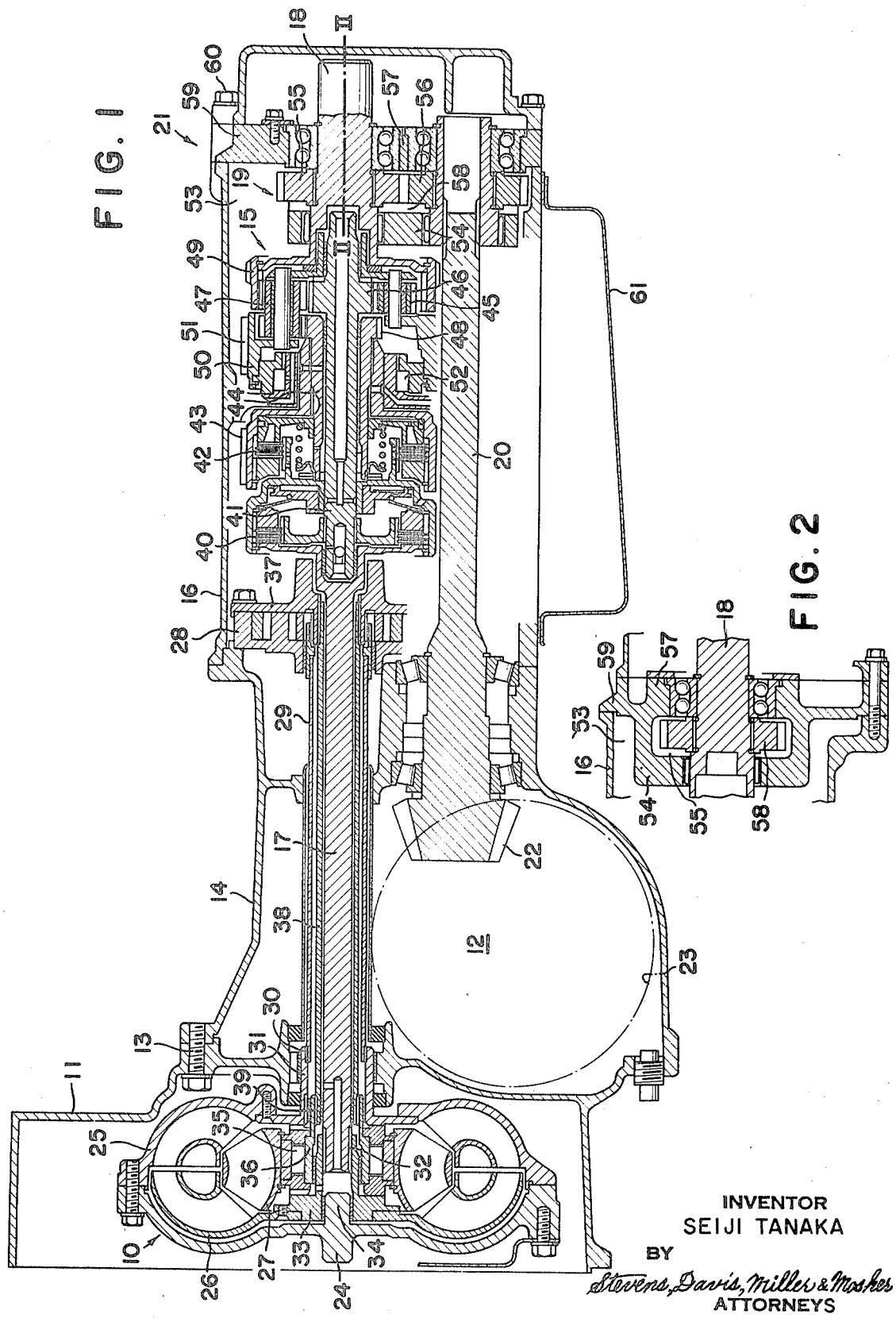

TRANSMISSION

BACKGROUND OF THE INVENTION

1. Field of the Invention

The present invention relates to improvements in the transmission used in automotive vehicles, particularly in front engine-front drive or rear engine-rear drive automotive vehicles.

2. Description of the Prior Art

In general, in this type of front engine-front drive or rear engine-rear drive automotive vehicles, an engine, a torque converter, a differential gear unit and a planetary gear unit are arranged in the order mentioned from the front side or rear side of the automotive vehicle, the driving force of the engine being transmitted to the planetary gear unit through the torque converter and the drive force transmitted through the planetary gear unit being further transmitted to the differential gear unit interposed between the torque converter and the planetary gear unit, after the direction thereof being changed. However, in the conventional driving apparatus of the type described, since the input shaft and output shaft of the planetary gear unit are located on one and the same side of said gear unit in coaxial relation so as to change the driving force transmitting direction, this planetary gear unit cannot commonly be used for the conventional planetary gear unit, i.e., the planetary gear unit for front engine-rear drive automotive vehicles. More particularly, in the front engine-rear drive automotive vehicles the engine, the torque converter, the planetary gear unit and the differential gear unit are arranged from the front side to the rear side of the automotive vehicle in the order mentioned and, therefore, it is necessary to project the input shaft and output shaft of the planetary gear unit in opposite directions to each other. For this reason, it has been necessary to design the planetary gear unit for use in front engine-rear drive vehicles and the planetary gear unit for use in front engine-front drive or rear engine-rear drive vehicles separately from each other.

SUMMARY OF THE INVENTION

The principal object of the present invention is to provide a transmission for use in front engine-front drive or rear engine-rear drive automotive vehicles, which is improved in such a manner that a planetary gear unit for use in front engine-rear drive automotive vehicles having an input and output shafts projecting from the opposite ends thereof can be mounted therein. More particularly, an object of the present invention is to provide a transmission for use in front engine-front drive or rear engine-rear drive automotive vehicles, of the character described, wherein a reversing gear set is mounted on the output shaft of the planetary gear unit extending in an opposite direction to the input shaft thereof and on a reversing shaft extending parallel to said output and input shafts, and a differential gear unit is connected to one end of said reversing shaft.

Another object of the invention is to improve two bearing members which support the output shaft of the planetary gear unit and the reversing shaft on both sides of the reversing gears, by making use of a useless space, for the purpose of shortening the total length of the transmission. Namely, in mounting the reversing gear set in the rear end of the transmission casing, it is necessary to support the output shaft and the reversing shaft, having the reversing gears mounted thereon, on both sides of said gears so as to ensure positive engagement of the gears. Furthermore, in this type of transmission the rear end of the transmission casing must be widely open to provide for insertion of the planetary gear unit into the transmission casing therethrough and it is also necessary to locate the open rear end of the transmission casing rearwardly of the rear end of the planetary gear unit by reason of the position of an oil pan provided below said transmission casing. Therefore, if the output shaft and the reversing shafts are supported by the two bearing members at a portion rearwardly of the transmission casing, a useless space is formed between the rear end of the planetary gear unit and that one of the bearing members which is closer to the transmission casing, and the total length of the transmission becomes long, making it impossible to mount the transmission in an automotive vehicle having a limited transmission mounting space. An object of the invention is to reduce the length of the transmission by locating the reversing gear set in the space between the rear end of the planetary gear unit and the open end of the transmission casing and also by forming the bearing member which supports the output shaft and reversing shaft on the front side of the reversing gear set, integrally with the bearing member which supports the same on the rear side of said reversing gear set and is fixed to the rear end portion of the transmission casing.

Still another object of the invention is to simplify the piping for oil by arranging an oil pump between the differential gear unit and the planetary gear unit, which is driven by a pump of the torque converter.

A further object of the invention is to provide a transmission of simplified structure for use in front engine-front drive or rear engine-rear drive automotive vehicles, wherein an oil pump is arranged between a differential gear unit and a planetary gear unit, and the rear end of a stator shaft is connected to the transmission casing on the rear side of the oil pump by means of a spline so as to be held against rotation, while the front end thereof is concentrically rotatably supported by a turbine shaft which is rotatably journaled in a pump cover, whereby the front end position of the stator is positively supported and simultaneously a pump shaft is shortened.

These and other objects, features and advantages of the present invention will become apparent from the following detailed description when taken in conjunction with the accompanying drawings.

BRIEF EXPLANATION OF DRAWINGS

FIG. 1 is a vertical sectional view showing an embodiment of the transmission according to the present invention and—

FIG. 2 is a sectional plan view taken on the line II—II in FIG. 1.

DESCRIPTION OF THE PREFERRED EMBODIMENT

Referring to FIG. 1, a torque converter 10 is driven from an engine (not shown) and placed in a torque converter housing 11. A differential gear unit 12 is placed in a differential gear housing 14 which is fixed at one end to the torque converter housing 11 by means of bolts 13. A planetary gear set 15 is placed in a transmission housing 16 which is fixed to the other end of the differential gear housing 14, and is operatively connected to the torque converter 10 through a turbine shaft 17 extending through said differential gear housing 14. The planetary gear set 15, having the turbine shaft 17 connected to one side thereof as an input shaft, has an output shaft 18 connected to the other side and the driving force, transmitted from the torque converter 10 through the turbine shaft 17, is transmitted to the output shaft 18 after having been suitably changed. The output shaft 18 is connected to a shaft 20 through a reversing gear set 19. The shaft 20 is offset by the reversing gear set 19 with respect to the axes of the turbine shaft 17 and the output shaft 18, and rotatably supported by the differential gear housing 14 and a bearing block 21 fixed to the open rear end of the transmission housing 16. That end of the shaft 20 which is located within the differential gear housing 14 is formed with a pinion gear 22 which constitutes the differential gear unit 12 in meshing engagement with a ring gear 23. The torque converter 10 includes a pump 25 fixed to a pump cover 24, a turbine 26 and a stator 27. The pump 25 includes a pump boss 31 connected to one end of a pump shaft 29 by a spline 30, which pump shaft 29 drives an oil pump 28 fixed to that end of the differential gear housing 14 adjoining the transmission housing 16. The turbine 26 includes a turbine boss 33 connected by a spline 32 to one end of the turbine shaft 17 which has the other end connected to the planetary gear set 15. The turbine boss 33 is rotatably supported on a projection 34 formed on the pump cover 24. The stator 27 is mounted on a stator boss 36 through a one-way clutch 35. The stator boss 36 is fixed on one end of a stator shaft 38 by a spline 39 to be held against rotation, which stator shaft 38 has the other end thereof fixed to an oil pump housing 37. The above-mentioned shafts, connected to the various parts of the torque converter 10, are arranged in such a manner as to mutually support the adjacent shafts to provide for smooth operation of the same. Namely, the turbine shaft 17 connected to the turbine boss 33 is supported by the projection 34 on the pump cover 24, the stator shaft 38 by the turbine shaft 17 and the pump shaft 29 by the stator shaft 38 through the pump boss 31. The planetary gear set 15 includes a first intermediary shaft 41 which will be connected to the turbine shaft 17 when a front clutch 40 is brought into an engaged position, and a second intermediary shaft 44 which will be connected to the turbine shaft 17 when a rear clutch 42 is brought into an engaged position and will be fixed to the transmission housing 16 when a front brake 43 is brought into an engaged position. The first intermediate shaft 41 has a rear sun gear 46 formed at one end thereof which is meshing with short pinion gears 45, whilst the second intermediate shaft 44 has a front sun gear 48 formed at one end thereof which is meshing with long pinion gears 47. The long pinion gears 47 are meshing with the short pinion gears 45 and a ring gear 49, and are supported by a carrier 50 together with the short pinion gears 45. The carrier 50 will be fixed to the housing 16 upon actuation of a rear brake 51. Also, the carrier 50 is held against rotation in one direction by a one-way clutch 52 which is interposed between it and the housing 16. The planetary gear set 15 provides a low, intermediate and high speed power trains when the aforesaid clutches and brakes are engaged in suitable combinations, and transmits the driving force, transmitted thereto from the turbine shaft 17, to the output shaft 18 upon converting the torque by the respective gears.

The bearing block 21 which supports the output shaft 18 and the shaft 20, is located within a space 53 formed between the end of the planetary gear set 15, closer to the output shaft, and the open end of the transmission housing 16, and has a bearing 54 to support the output shaft 18 and the shaft 20 at portions forwardly of reversing gears 55 and 56 which are located within said space 53, and a bearing 57 to support said output shaft 18 and said shaft 20 at portions rearwardly of said reversing gears 55 and 56. The bearings 54 and 57 are formed integrally, with a space 58 formed therebetween for mounting the reversing gears 55 and 56, and the integral bearing unit is fixed to the rear open end of the transmission housing 16 by means of bolts 60 at a mounting portion 59 of the bearing 57. Thus, it will be seen that the driving force from the engine is transmitted to the torque converter 10 and the turbine shaft 17, thence to the output shaft 18 through the planetary gear set 15 and further to the differential gear unit 12 in the differential gear housing 14, interposed between the torque converter housing 11 and the transmission housing 16, after the driving force transmitting direction has been changed by the reversing gear set 19 and the shaft 20. By arranging the reversing gear set 19 in the rear end portion of the transmission and arranging the shaft 20 offset with respect to the axes of the input shaft of the planetary gear set 15, that is the turbine 17, and the output shaft 18, as described above, it is possible to dispose within the transmission housing 16 the planetary gear set having the input and output shafts on the front and rear sides thereof respectively, so that a transmission designed for use in front engine-rear drive automobiles can be used with no substantial design change.

Moreover, in improving the working efficiency of the transmission by arranging such that the planetary gear set 15 can be inserted into the transmission housing 16 from the rear open end thereof, if the output shaft 18 and the shaft 20 are supported in the conventional manner, the transmission becomes undesirably long due to a useless space formed between the rear end of the planetary gear set 15 and the open rear end of the transmission housing 16. However, according to the present invention wherein the reversing gear set is placed within the transmission housing 16, and the output shaft 18 and the shaft 20 are supported by the bearing member 21 which comprises as an integral unit the bearing 54 supporting said output shaft 18 and said shaft 20 at portions forwardly of the reversing gears 55 and 56 respectively and the bearing 57 supporting the same at portions rearwardly of said reversing gears respectively, and which is fixed to the open rear end of the transmission housing at the mounting portion 59 of the bearing 57, the useless space can be eliminated and the length of the transmission can be shortened.

Further, below the transmission housing 16 or above an oil pan 61 are provided various valves (not shown) which are required for hydraulic transmission operation, and according to the present invention a fluid pressure source for such valves is fixed to that end of the differential gear housing 14 adjoining the transmission housing 16. Such arrangement is advantageous in eliminating the complicated piping for oil supply which has been a shortcoming of the conventional transmission used in front engine-front drive or rear engine-rear drive automobiles.

In the present invention, the oil pump 28 is spaced from the driving member, that is the pump 25 of the torque converter 10, and such arrangement creates a problem in the concentricity of the pump shaft 29 and of the stator shaft 38 provided in said pump shaft. However, these problems can be solved by connecting the bosses 31, 33 and 36 of the pump 25, turbine 26 and stator 27 to the shafts 29, 17 and 38 by the splines 30, 32 and 39 respectively, supporting the innermost turbine boss 33 by the projection 34 on the pump cover 24 and supporting the stator shaft 38 by the turbine shaft 17 and the pump shaft 29 by the stator shaft 38.

What is claimed is:
1. A transmission comprising in combination
  a. a first housing accommodating a torque converter to be driven from an engine,
  b. a second housing accommodating a differential gear unit to drive the wheels and having one end fixed to said first housing,
  c. a third housing accommodating a planetary gear set to be driven by said torque converter and having one end fixed to the other end of said second housing,
  d. said torque converter including a pump, a turbine and a stator,
  e. a turbine shaft extending through said second housing to connect said turbine with one end of said planetary gear set,
  f. a supporting member supporting a reversing gear set including at least two gears and connected with the other end of said third housing,
  g. an output shaft connecting the other end of said planetary gear set with one gear of said reversing gear set,
  h. a reversing shaft offset with respect to the axes of said turbine shaft and the output shaft and connecting another gear of said reversing gear set with said differential gear unit,
  i. driving means connected to the engine and the pump of said torque converter and supporting said turbine shaft by a projection formed at the center thereof,
  j. said turbine shaft connected with a boss of said turbine by a spline,
  k. an oil pump interposed between said differential gear unit and said planetary gear set within at least one of said housings,
  l. a hollow stator shaft coaxial with said turbine shaft to be supported thereby and having one end connected to said stator of said torque converter and the other end fixed to one of said housings between said oil pump and said planetary gear set, and
  m. a hollow pump shaft coaxial with said stator shaft to be supported thereby and having one end connected to said pump of said torque converter and the other end connected to drive said oil pump.
2. A transmission as claimed in claim 1, further comprising a. a boss on said stator connected to said stator shaft by a spline, and
b. a boss on said pump of said torque converter connected to said pump shaft by a spline.

3. A transmission as claimed in claim 2, further comprising a spline on said stator shaft connecting said stator shaft with one of said housings between said oil pump and said planetary gear set.

* * * * *